(12) United States Patent
Crawford

(10) Patent No.: US 7,699,328 B2
(45) Date of Patent: Apr. 20, 2010

(54) RETRACTABLE STEP FOR CAB OF MOBILE MACHINE

(75) Inventor: Patrick Lee Crawford, Shawano, WI (US)

(73) Assignee: Timberpro Inc., Shawano, WI (US)

( * ) Notice: Subject to any disclaimer, the term of this patent is extended or adjusted under 35 U.S.C. 154(b) by 309 days.

(21) Appl. No.: 11/778,358

(22) Filed: Jul. 16, 2007

(65) Prior Publication Data

US 2009/0021049 A1    Jan. 22, 2009

(51) Int. Cl.
*B60R 3/02* (2006.01)
(52) U.S. Cl. ........................ 280/166; 280/163
(58) Field of Classification Search ........ 280/760, 280/763.1, 163, 164.1, 166, 169; 296/190.08
See application file for complete search history.

(56) References Cited

U.S. PATENT DOCUMENTS

| | | | | |
|---|---|---|---|---|
| 374,217 | A * | 12/1887 | Vincent et al. | 105/443 |
| 691,872 | A * | 1/1902 | Rehkopf | 182/90 |
| 1,436,414 | A * | 11/1922 | Stanwood | 280/169 |
| 2,024,499 | A * | 12/1935 | Baron | 74/594.4 |
| 2,305,016 | A * | 12/1942 | Leppla | 52/668 |
| 2,414,573 | A | 1/1947 | Wagner et al. | 212/70 |
| 2,860,822 | A * | 11/1958 | Smith et al. | 182/93 |
| 3,033,309 | A * | 5/1962 | Fugere | 182/90 |
| 3,233,909 | A | 2/1966 | Boone | 280/6 |
| 3,238,981 | A | 3/1966 | Larson et al. | 144/34 |
| 3,269,436 | A | 8/1966 | Moore | 144/3 |
| 3,341,247 | A * | 9/1967 | Martinmaas | 296/190.08 |
| 3,477,588 | A | 11/1969 | Reischl | 212/55 |
| 3,498,350 | A | 3/1970 | Maradyn | 144/309 |
| 3,572,746 | A | 3/1971 | Mueller | 280/112 |
| 3,575,222 | A | 4/1971 | Tucek | 144/34 |
| 3,599,801 | A | 8/1971 | Roll | 212/35 |

(Continued)

FOREIGN PATENT DOCUMENTS

GB    1487935    10/1977

OTHER PUBLICATIONS

TiberPro LLC, TimberPro T800 "E" Series brochure.

(Continued)

*Primary Examiner*—S. Joseph Morano
*Assistant Examiner*—Bryan A Evans
(74) *Attorney, Agent, or Firm*—Alan Kamrath; Kamrath & Associates PA

(57) ABSTRACT

A retractable step assembly (400) for a cab (C) for a mobile machine includes a leg (450) slideably received in a through-hole (408) in a platform (58) of a cab (C). An upper end (452) of the leg (450) is fixed to a lower end (434) of a stretchable spring (430) whose upper end (432) is fixed. A step (470) is mounted to the lower end (454) of the leg (450). The leg (450) is movable between a retracted position and an extended position in which the step (470) is nearer to the ground than in the retracted position. The step (470) can be stepped on by an operator to move the leg (450) to the extended position to thereby allow the operator to exit the cab (C) by stepping on the step (470). The leg (450) can be unlatched by the operator in the cab (C) to return to the retracted position under action of the spring (430).

9 Claims, 3 Drawing Sheets

U.S. PATENT DOCUMENTS

| | | | | |
|---|---|---|---|---|
| 3,601,169 A | | 8/1971 | Hamilton et al. | 144/34 R |
| 3,670,834 A | | 6/1972 | Rogers | 180/41 |
| 3,708,000 A | | 1/1973 | Duffty et al. | 144/3 D |
| 3,720,245 A | | 3/1973 | Puna | 144/3 D |
| 3,727,653 A | | 4/1973 | Tucek | 144/34 E |
| 3,763,905 A | | 10/1973 | Hamilton et al. | 144/3 D |
| 3,807,586 A | | 4/1974 | Holopainen | 214/138 R |
| 3,951,431 A | * | 4/1976 | Hopkins | 280/166 |
| 3,977,547 A | | 8/1976 | Holopainen | 214/131 R |
| 3,981,336 A | | 9/1976 | Levesque | 144/3 D |
| 4,063,359 A | | 12/1977 | Luscombe | 30/379.5 |
| 4,071,260 A | * | 1/1978 | Marshall, Sr. | 280/166 |
| 4,095,839 A | | 6/1978 | Lawrence et al. | |
| 4,102,461 A | | 7/1978 | Soyland | 214/132 |
| D249,523 S | | 9/1978 | Segales | D15/30 |
| 4,194,787 A | | 3/1980 | Williamsen | 298/23 M |
| 4,324,317 A | * | 4/1982 | Winkelblech | 187/267 |
| 4,326,571 A | | 4/1982 | Crawford | 144/34 E |
| 4,365,927 A | | 12/1982 | Schenck | 414/729 |
| 4,459,061 A | | 7/1984 | Klement | 403/163 |
| 4,565,486 A | | 1/1986 | Crawford et al. | 414/729 |
| 4,583,908 A | | 4/1986 | Crawford | 414/694 |
| 4,605,257 A | * | 8/1986 | Lang et al. | 296/26.03 |
| D288,206 S | | 2/1987 | Moscovitch | D15/30 |
| D292,632 S | | 11/1987 | Lich | D34/37 |
| 4,907,667 A | | 3/1990 | Yamamoto et al. | |
| 5,016,721 A | | 5/1991 | Yamamoto et al. | |
| 5,033,582 A | * | 7/1991 | Hoben | 182/85 |
| 5,096,253 A | | 3/1992 | Jo et al. | 296/190 |
| 5,273,340 A | | 12/1993 | Nelson et al. | 296/190 |
| D366,267 S | | 1/1996 | Lepoix | D15/30 |
| 5,553,993 A | | 9/1996 | Gilbert et al. | |
| D389,984 S | | 1/1998 | Johansson | D34/37 |
| D391,273 S | | 2/1998 | Linder | D15/30 |
| D394,069 S | | 5/1998 | Muranen | D15/30 |
| D398,616 S | | 9/1998 | Kwak et al. | D15/30 |
| 5,840,396 A | * | 11/1998 | Betz | 428/67 |
| 5,931,247 A | | 8/1999 | Peterson | |
| D427,612 S | | 7/2000 | Shim | D15/23 |
| D432,145 S | | 10/2000 | Kraft et al. | D15/30 |
| D433,689 S | | 11/2000 | Kraft et al. | D15/30 |
| 6,155,632 A | | 12/2000 | Fujimoto | |
| 6,170,588 B1 | | 1/2001 | Irino et al. | |
| 6,244,369 B1 | * | 6/2001 | Yunoue et al. | 180/89.12 |
| D455,763 S | | 4/2002 | Brandenburg, III et al. | D15/30 |
| 6,394,212 B1 | | 5/2002 | Takano et al. | |
| D463,461 S | | 9/2002 | Yanagida et al. | D15/30 |
| D463,462 S | | 9/2002 | Yanagida et al. | D15/30 |
| D463,807 S | | 10/2002 | Tamaru et al. | D15/30 |
| 6,502,896 B1 | | 1/2003 | Nakata et al. | |
| D471,213 S | | 3/2003 | Kwak et al. | D15/30 |
| D481,044 S | | 10/2003 | Tokach et al. | D15/30 |
| 6,669,272 B2 | | 12/2003 | Ayabe et al. | 296/190.08 |
| D505,432 S | | 5/2005 | Antonetti | D15/30 |
| D523,029 S | | 6/2006 | Crawford et al. | D15/30 |
| 2007/0145759 A1 | | 6/2007 | Crawford et al. | |

OTHER PUBLICATIONS

TiberPro LLC, TimberPro TB620-E brochure.

\* cited by examiner

RETRACTABLE STEP FOR CAB OF MOBILE MACHINE

BACKGROUND OF THE INVENTION

The present invention relates to a step for a cab of a machine and, more particularly, to a retractable step allowing easy and safe access to and from a cab of a material handling machine.

Mobile machines such as material handling machines generally include a cab for receiving an operator. The cabs of some mobile machines, particularly tree handling machines, are located at a high level to provide clearance for the mobility providing members such as tires or tracks as well as the mechanisms such as turntable, tilt mechanisms, engines and the like. It would be desirable to include a ladder to allow easy access to and from the cab and to avoid injury to the operator resulting from falling while trying to access to or from the cab. However, such ladders are bulky, tree limbs or the like easily catch on ladders when the machines are operating or moving in a row of trees, and such ladders could interfere with rotation and/or tilting of the cab during operation of the material handling machine.

Therefore, a need exists for a step assembly that can be retracted to a position not interfering with operation or movement of a mobile machine and that can be extended allowing easy and safe access to the cab of the mobile machine.

BRIEF SUMMARY OF THE INVENTION

The present invention solves this need and other problems in the field of cabs for material handling machines by providing, in a preferred form, a retractable step assembly having a step that can be moved from a retracted position not interfering with operation of the mobile machine to an extended position allowing easy and safe access to and from a cab. In the preferred form, the cab includes a platform and a plurality of partitions mounted on a top side of the platform to define an enclosure for receiving an operator. A door is provided in one of the partitions to allow access to and from the enclosure. The step assembly includes a leg slideably received in a through-hole extending between the top side and an underside of the platform. A step is mounted to a lower end of the leg that extends downward through the through-hole of the platform. An upper end of the leg is fixed to a lower end of a spring whose upper end is fixed and spaced from the through-hole of the platform. The leg is movable between a retracted position and an extended position and biased by the spring from the extended position to the retracted position in which a spacing between the step and the underside of the platform is larger than that in the retracted position. The step can be stepped on by the operator to move the leg from the retracted position to the extended position where the leg is automatically latched against movement by the bias of the spring, thereby allowing easy and safe access to and from the enclosure. When the operator is in the enclosure, the leg in the extended position can be unlatched by the operator to move back to the retracted position under action of the spring such that the step will not interfere with operation of the machine.

A corner partition extends at an obtuse angle with the front partition and at an obtuse angle with the side partition including the door to enhance operator visibility and comfort and to minimize detrimental engagement of tree limbs during operation while providing a uniquely aesthetic appearance. A tube is mounted in an interconnection between the side partition and the corner partition and includes a vertical hole for receiving the spring and the leg. The upper end of the spring is in the form of a hook engaged with a pin extending through the upper end of the tube to allow simple assembly. A bottom plate is fixed to the underside of the platform and includes a slot through which the leg slideably extends. The leg and the slot of the bottom plate include non-circular cross-sections preventing rotation of the leg relative to the bottom plate. To prevent excessive extension of the leg out of the cab, a bulge is formed between the upper and lower ends of the leg and has a size greater than and abutting with the slot of the mounting plate. A shoe is mounted to the step and includes two spaced wings between which the step is securely received. Each wing has a plurality of serrations on a top edge thereof to avoid the operator from slipping and falling while stepping on the step. A latch retains the spring in a stretched state for releasably latching the leg in the extended position. The latch includes a handle and a plunger having a first end interconnected to the handle and a second end that engages with a catch portion of the leg when the leg is in the extended position. The handle can be pulled by the operator to disengage the second end of the plunger from the catch portion of the leg allowing the leg to move from the extended position to the retracted position. The step is, thus, retracted to avoid tree limbs, etc. from catching on it while the mobile machine is operating or moving in a row of trees.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
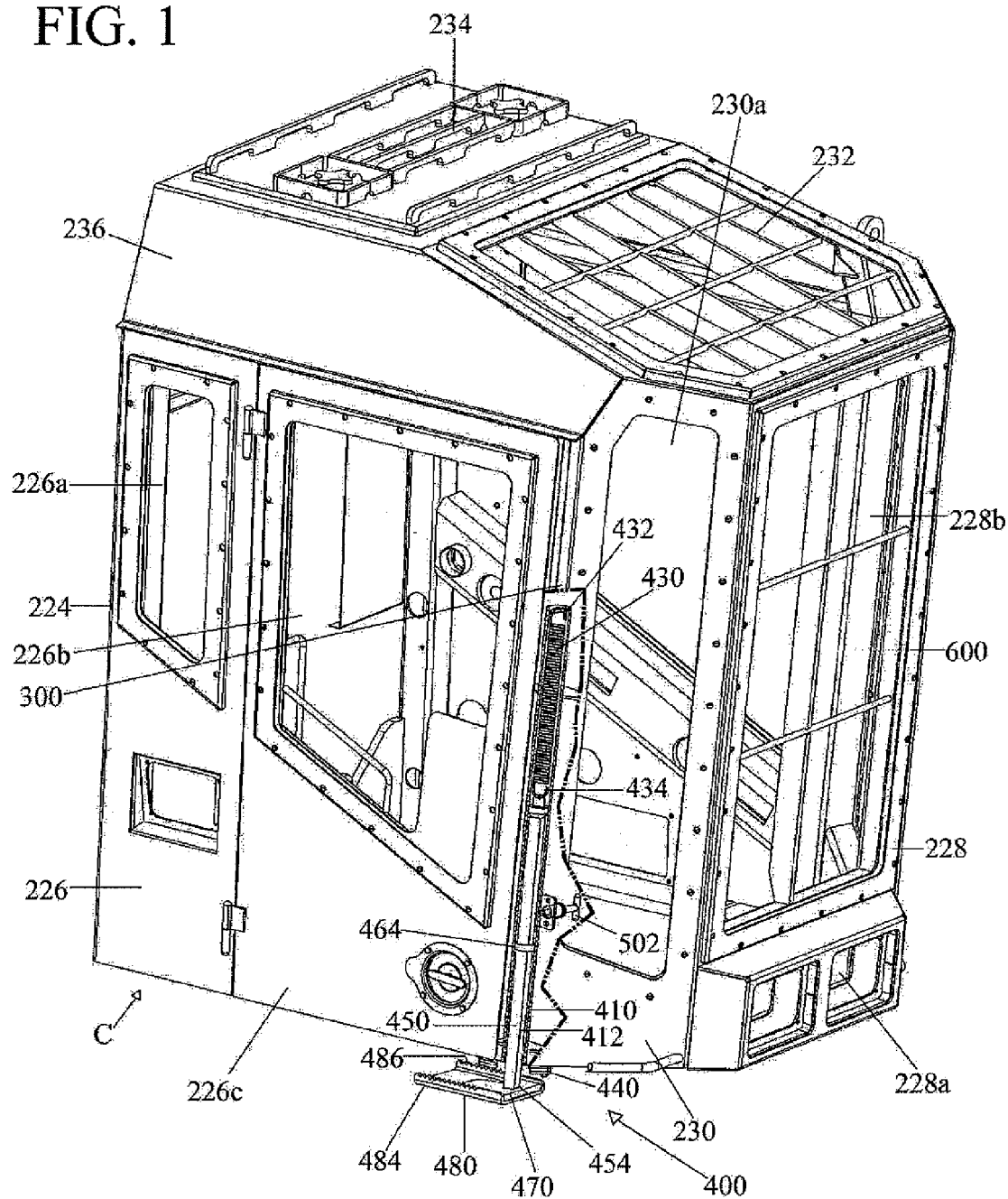
FIG. 1 shows a diagrammatic perspective view of a cab for a mobile machine according to the preferred teachings of the present invention with portions broken away.
Figure 2:
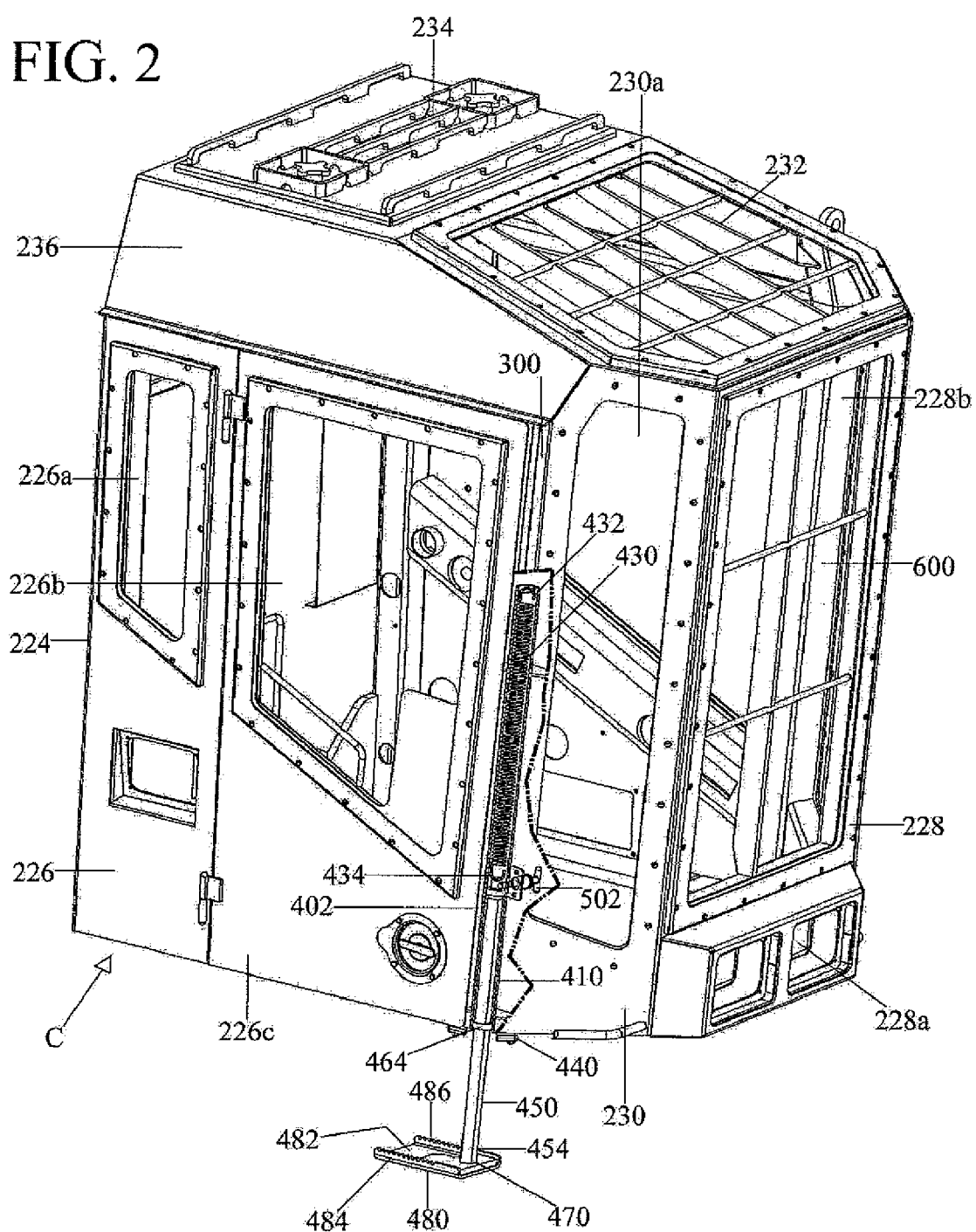
FIG. 2 shows a perspective view of the cab of FIG. 1 with portions broken away and with a step of a retractable step assembly in an extended position.
Figure 3:
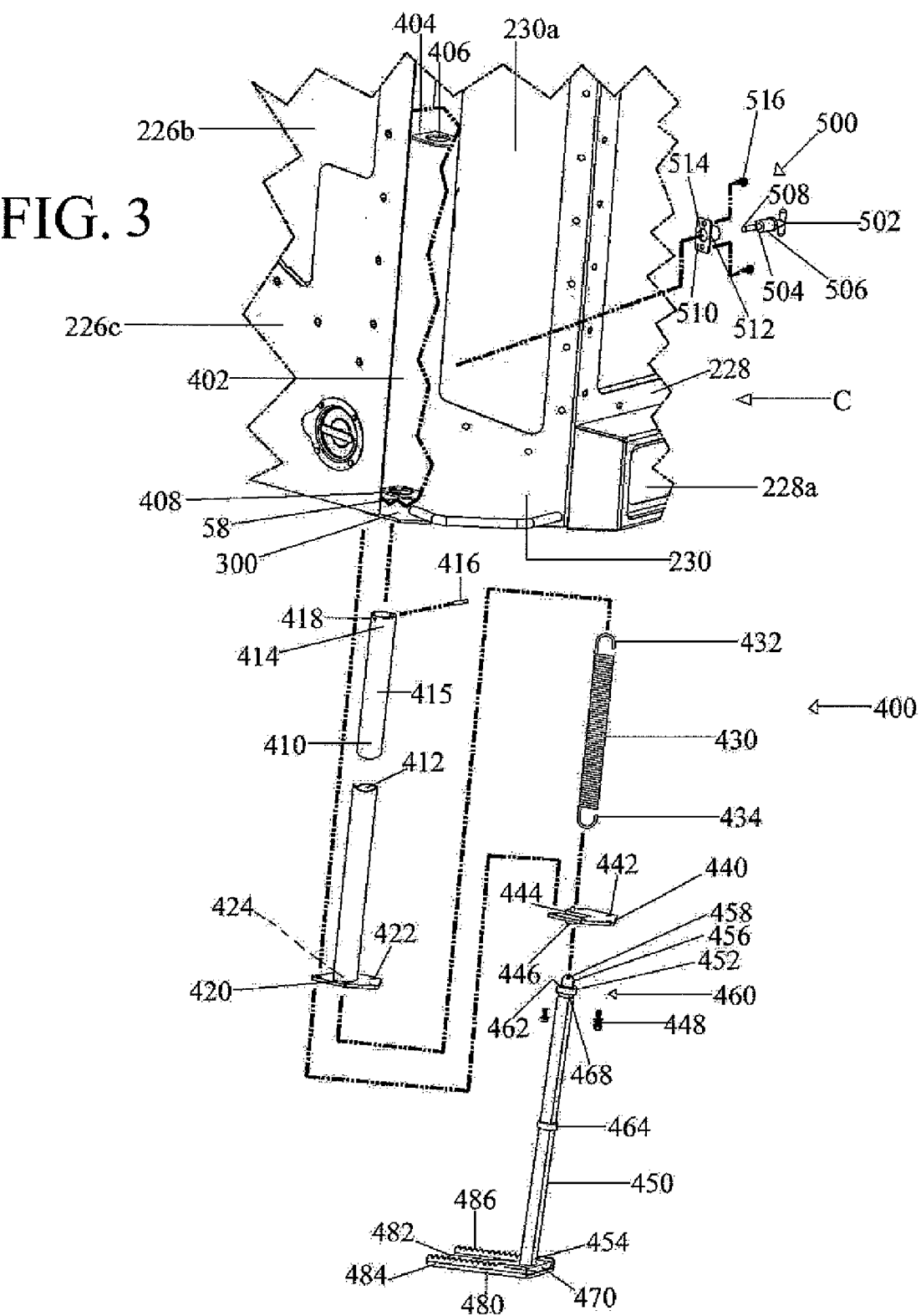
FIG. 3 shows a perspective view of the cab of FIG. 1 with portions broken away and with the retractable step assembly exploded.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "portion", "longitudinal", "vertical", "horizontal", "radial", "inward", "spacing", and similar terns are used herein, it should be understood that these terms have reference only to the structure shown in the drawings as it would appear to a person viewing the drawings and are utilized only to facilitate describing the invention.

DETAILED DESCRIPTION OF THE INVENTION

A retractable step assembly according to the preferred teachings of the present invention is shown in the drawings and generally designated 400. In a most preferred form, the retractable step assembly 400 is mounted to a cab C that can be mounted on a frame of a mobile machine including but not limited to a material handling machine such as a mobile tree handling machine. In the most preferred embodiment of the present invention shown, cab C is of the type shown and described in the U.S. patent application Ser. No. 11/306,434. For purpose of explanation of the basics teachings of the present invention, the same numerals designate the same or similar parts in the present figures and the figures of U.S. patent application Ser. No. 11/306,434. The description of the common numerals and cab C may be found herein and in U.S. patent application Ser. No. 11/306,434, which is hereby incorporated herein by reference.

It is however appreciated that cab C of other forms would be within the skill of the art. The frame of the mobile machine can be provided with mobility by wheels, tracks, etc which would be within the skill of the art. Cab C includes a platform 58 having a through-hole 408 extending between a top side and an underside of platform 58. Platform 58 is mounted on the frame of the mobile machine and may be rotatable if desired.

According to the preferred form, cab C includes a back partition 224 extending generally perpendicularly from platform 58. Back partition 224 can include a window having suitable grills for safety reasons. Cab C further includes inner and outer side partitions 226 extending parallel to and spaced from each other and extending generally perpendicularly to back partition 224. Each of side partitions 226 includes rear and front windows 226a and 226b. In the most preferred form shown, outer side partition 226 includes a door 226c having window 226b and which is hinged to allow access into cab C by an operator. Cab C further includes a front partition 228 located generally parallel to and spaced from back partition 224 and perpendicular to side partitions 226. Located at the bottom of front partition 228 are headlights 228a. Front partition 228 has a window 228b having suitable grills for safety reasons. Cab C further includes inner and outer corner partitions 230 extending between the front edges of partitions 226 and the side edges of front partition 228. Each corner partition 230 is at an obtuse angle with front partition 228 and at an obtuse angle with side partition 226. In the most preferred form shown, the obtuse angle between corner partition 230 and front partition 228 is 135°, and the obtuse angle between corner partition 230 and side partition 226 is 135°. Corner partition 230 further includes a window 230a. Further, cab C includes a roof window 232 having a front edge generally corresponding to the top edges of front partition 228 and linear portions of partitions 230, parallel side edges, and a rear edge extending perpendicularly between the side edges. Cab C further includes a roof partition 234 extending between back partition 224 and roof window 232. Cab C further includes side roof partitions 236 sloping inwardly from partitions 226. Partitions 224, 226, 228, 230, 234 and 236 together define an enclosure 600 for receiving the operator.

A vertical compartment 402 is defined in an interconnection 300 between outer side partition 226 and outer corner partition 230 for receiving the retractable step assembly 400 according to the preferred teachings of the present invention. Vertical compartment 402 is above and in communication with through-hole 408 of platform 58 and extends in a vertical direction perpendicular to platform 58. A holder 404 extends horizontally inward from a perimeter wall defining vertical compartment 402 and has a hole 406 spaced from through-hole 408 of platform 58 in the vertical direction.

In the preferred form shown, the retractable step assembly 400 includes a mounting plate 420 fixed to the underside of platform 58 by extending fasteners 448 through holes 422 in mounting plate 420. Mounting plate 420 extends in a horizontal direction parallel to the underside of platform 58 and includes a through-hole 424 aligned with through-hole 408 of platform 58. A bottom plate 440 is fixed to an underside of mounting plate 420 by extending fasteners 448 through holes 442 in a perimeter portion of bottom plate 440. Bottom plate 440 extends in the horizontal direction parallel to the underside of mounting plate 420. Bottom plate 440 further includes a slot 444 in alignment with through-hole 408 of platform 58. Slot 444 has non-circular cross-sections perpendicular to the vertical direction. In the most preferred form shown, slot 444 is rectangular in section. A rubber stopper 446 is formed on an underside of bottom plate 30.

A tube 410 extends upward from mounting plate 420 through through-hole 408 of platform 58. A pin 416 extends through a radial pin hole 418 in an upper end 414 of tube 410. An intermediate portion 415 of tube 410 between upper end 414 and mounting plate 420 extends through hole 406 in holder 404 for holding tube 410. Tube 410 includes a vertical hole 412 in alignment with through-holes 408 and 424 of platform 58 and mounting plate 420 and parallel to the vertical direction. A spring 430 is received in vertical hole 412 of tube 410 and includes an upper end 432 and a lower end 434. Spring 430 is stretchable in the vertical direction. In the most preferred form shown, upper end 432 of spring 430 is in the form of a hook engaged with the pin 416, and lower end 434 of spring 430 is also in the form of a hook.

A leg 450 includes an upper end 452 received in vertical hole 412 of tube 410 and a lower end 454 extending downward through through-hole 408 of platform 58 and slot 444 of bottom plate 440. Upper end 452 of leg 450 is attached to lower end 434 of spring 430 and has a catch portion 460. In the most preferred form shown, catch portion 460 includes a projection 456 protruding upward from upper end face 462 of upper end 452 of leg 450. Projection 456 has a hole 458 engaged with lower end 434 of spring 430. Upper end face 462 of leg 450 extends perpendicularly to a longitudinal direction of leg 450. Leg 450 further includes a bulge 464 between upper and lower ends 42 and 41 thereof. Bulge 464 has a size greater than slot 444 of bottom plate 440. Leg 450 has non-circular cross-sections perpendicular to the vertical direction. In the most preferred form shown, leg 450 is made of square steel bar and, thus, has square cross-sections fittingly and slideably received in slot 444 of bottom plate 440 with rectangular cross-sections to avoid rotational movement of leg 450 during sliding movement of leg 450 in the vertical direction between a retracted position and an extended position. Leg 450 further includes a round welded on intermediate portion of leg 450 to form bulge 464, with upper end 452 having a diameter larger than the square section, and with a bevel 468 formed between the square section and upper end 452.

A step 470 is mounted to lower end 454 of leg 450 and extends in the horizontal direction parallel to mounting plate 420. A shoe 480 is mounted to the step 470 and includes two spaced wings 484 extending in a direction parallel to the horizontal direction of step 470 and defining a groove 482 therebetween in which step 470 is securely received. A plurality of serrations 486 are formed on a top edge of each wing 484 allowing step 470 to be stepped on for moving leg 450 from the retracted position to the extended position.

A latch 500 is mounted in enclosure 600 for retaining spring 430 in a stretched state for releasably latching leg 450 in the extended position. In the preferred form shown, latch 500 includes a handle 502 and a plunger 504 extending from handle 502 in a direction perpendicular to the vertical direction. Plunger 504 has a first end 506 interconnected to handle 502 and a second end 508. A faceplate 510 is fixed by fasteners 516 to an inner face of interconnection 300 between corner partition 230 and side partition 226. A housing 512 extends from faceplate 510 and has a longitudinal hole 514 transverse to and in communication with vertical compartment 402. Second end 508 of plunger 504 extends through longitudinal hole 514 into vertical compartment 402, and handle 502 is located outside housing 512 for manual operation. Latch 500 includes a spring to bias second end 508 of plunger 504 into vertical compartment 402.

Now that the basic construction of retractable step assembly 400 of the preferred teachings of the present invention has been explained, the operation and some of the advantages of retractable step assembly 400 can be set forth and appreciated. In articular, for the sake of explanation, it will be assumed that the operator is in cab C and leg 450 is in the retracted position shown in FIG. 1. Second end 508 of plunger 504 rests on an outer peripheral face of leg 450. When the operator wants to leave enclosure 600, the operator steps on shoe 480 to move leg 450 from the retracted position to the extended position while stretching spring 430. It can be appreciated that step 470 is closer to cab C allowing the operator to step on shoe 480 easily and safely when leg 450 is in the retracted position. Leg 450 is moved past second end 508 of plunger 504 to the extended position. When second end 508 of plunger 504 moves across bevel 468 and upper end 452 of leg 450, the spring of latch 500 moves second end 508 of plunger 504 to upper end face 462 of leg 450. Thus, second end 508 of plunger 504 engages with catch portion 460 of leg 450 to retain leg 450 in the extended position against spring 430. Bulge 464 of leg 450 abuts with slot 444 of bottom plate 440 to prevent excessive extension of leg 450 out of cab C. It is noted that rotation of leg 450 is prevented by provision of the non-circular cross-sections of leg 450 and slot 444 of bottom plate 440. In the extended position, a spacing between step 470 and underside of platform 58 is larger than that in the retracted position. Thus, operator stepping on shoe 480 can step down to the ground easily and safely. It can be appreciated that bulge 464 of leg 450 stops on bottom plate 440 and takes the load when the operator is stepping on shoe 480. It can be further appreciated that serrations 486 of shoe 480 avoid the operator from slipping and falling while stepping on step 470/shoe 480.

If the operator wants to reenter enclosure 600, the operator steps on shoe 480 to enter enclosure 600 via door 226c, which is easy and safe. After entering enclosure 600, the operator pulls handle 502 to disengage second end 508 of plunger 504 from catch 460 of leg 450. Leg 450 moves back to the retracted position under action of spring 430. Rubber stopper 446 on bottom plate 440 absorbs impact from step 470/shoe 480 and, thus, avoids damage to step 470/shoe 480. Cab C may include an indicator lamp to remind the operator of the position of step 470/shoe 480. Retracted step 470/shoe 480 avoids tree limbs, etc from catching on step 470/shoe 480 while the mobile machine is operating or moving in a row of trees. Also, retracted step 470/shoe 480 does not interfere with rotation and/or tilting of cab C during operation of the mobile material handling machine.

Now that the basic teachings of the present invention have been explained, many extensions and variations will be obvious to one having ordinary skill in the art. For example, mounting plate 420 can be omitted if desired. Vertical compartment 402 can be formed and defined by tube 410 for receiving spring 430 and leg 450. Catch portion 460 of leg 450 and latch 500 of other forms can be utilized. It is however appreciated that cab C of other forms would be within the skill of the art. It is further appreciated that the retractable step assembly 400 according to the preferred teachings of the present invention can be utilized on any type of cabs for mobile machines.

The retractable step assembly 400 according to the preferred teachings of the present invention can be easily installed on currently available mobile machines at low cost. Furthermore, step 470/shoe 480 can be moved from the retracted position to the extended position and vice versa through simple operations. Furthermore, step 470/shoe 480 can be retained in the retracted position and, thus, does not interfere with operations or movements of the mobile machine.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A cab for a mobile machine comprising, in combination:
   a platform having a top side and an underside, with a through-hole extending through the platform between the top side and the underside;
   a plurality of partitions mounted on the top side of the platform and defining an enclosure for receiving an operator, with one of the plurality of partitions including a door allowing access to and from the enclosure;
   a leg slideably received in the through-hole, with the leg including a lower end extending downward through the through-hole of the platform;
   a spring including an upper end and a lower end, with the leg including an upper end fixed to the lower end of the spring, with the upper end of the spring being fixed to the enclosure spaced from the through-hole, with the spring being stretchable in a vertical direction perpendicular to the platform; and
   a step mounted to the lower end of the leg and extending in a horizontal direction parallel to the platform,
   with the leg being movable between a retracted position and an extended position in which a spacing between the step and the underside of the platform is larger than that in the retracted position, with the leg being biased by the spring from the extended position to the retracted position, and with the leg being releasably latched in the extended position against bias of the spring, and
   with the step being adapted to be stepped on by the operator to move the leg from the retracted position to the extended position to thereby allow the operator to exit the enclosure via the door by stepping on the step, and with the leg in the extended position being adapted to be unlatched by the operator in the enclosure to return to the retracted position under action of the spring.

2. The cab as claimed in claim 1 with the plurality of partitions including a front partition and a side partition, with the side partition having the door, with the plurality of partitions further including a corner partition extending between the front partition and the side partition, with the corner partition being at an obtuse angle with the front partition and at an obtuse angle with the side partition, and with the spring and the leg being located in an interconnection between the side partition and the corner partition.

3. The cab as claimed in claim 1 further comprising, in combination: a tube mounted in one of the plurality of partitions, with the tube including a vertical hole in alignment with the through-hole of the platform and parallel to the vertical direction, and with the spring being stretchably received in the vertical hole of the tube.

4. The cab as claimed in claim 3 further comprising, in combination: a bottom plate fixed to the underside of the platform, with the bottom plate including a slot through which the leg slideably extends, with each of the leg and the slot of the bottom plate including non-circular cross-sections perpendicular to the vertical direction preventing rotation of the leg relative to the bottom plate.

5. The cab as claimed in claim 4 with the leg including a bulge between the upper end and the lower end thereof, and with the bulge having a size greater than and abutting with the slot of the mounting plate for preventing excessive extension of the leg out of the cab.

6. The cab as claimed in claim 3 with the tube including an upper end and an intermediate portion, with one of the plurality of partitions including a holder spaced from the through-hole, with the holder including a through-hole through which the intermediate portion of the tube extends, with the cab further comprising, in combination: a pin extending through the upper end of the tube, with the upper end of the spring being a hook engaged with the pin.

7. The cab as claimed in claim 1 further comprising, in combination: a shoe mounted to the step and including two spaced wings extending in a direction parallel to the horizontal direction of the step and defining a groove therebetween in which the step is received, with each of the wings including a plurality of serrations on a top edge thereof and with the plurality of serrations being adapted to be stepped on for moving the leg from the retracted position to the extended position.

8. The cab as claimed in claim 1 further comprising, in combination: a latch for retaining the spring in a stretched state for releasably latching the leg in the extended position, with the leg including a catch portion, with the latch including a handle and a plunger extending from the handle in a direction perpendicular to the vertical direction, with the plunger having a first end interconnected to the handle and a second end, with the second end of the plunger abutting against the catch portion of the leg when the leg is in the extended position, with the handle being operable to disengage the second end of the plunger from the catch portion of the leg to allow the leg to move from the extended position to the retracted position, with the catch portion comprising an end face having a projection protruding from the upper end of the leg, and with the projection being attached to the lower end of the spring.

9. The cab as claimed in claim 8 with the latch further comprising a faceplate adapted to be fixed to an inner face of one of the plurality of partitions that has a compartment in which the spring is received; and a housing extending from the faceplate and having a longitudinal hole transverse to and in communication with the compartment, with the second end of the plunger extending through the longitudinal hole into the compartment, and with the handle being located outside the housing for manual operation.

* * * * *

UNITED STATES PATENT AND TRADEMARK OFFICE
CERTIFICATE OF CORRECTION

PATENT NO.        : 7,699,328 B2
APPLICATION NO.   : 11/778358
DATED             : April 20, 2010
INVENTOR(S)       : Patrick Lee Crawford It is certified that error appears in the above-identified patent and that said Letters Patent is hereby corrected as shown below:

Column 5, line 15, cancel "articular" and substitute therefore --particular--.

Signed and Sealed this

Twenty-fifth Day of May, 2010

David J. Kappos
*Director of the United States Patent and Trademark Office*